(12) United States Patent
Clark et al.

(10) Patent No.: US 8,723,071 B2
(45) Date of Patent: May 13, 2014

(54) ATMOSPHERIC SHIELD WITH A CONTINUOUS CHANNEL SEAL FOR ISOLATING WELDING COMPONENTS

(75) Inventors: Daniel Clark, Derby (GB); Jeffrey Allen, Derby (GB)

(73) Assignee: Rolls-Royce PLC, London (GB)

( * ) Notice: Subject to any disclaimer, the term of this patent is extended or adjusted under 35 U.S.C. 154(b) by 1535 days.

(21) Appl. No.: 11/798,254

(22) Filed: May 11, 2007

(65) Prior Publication Data
US 2007/0262122 A1 Nov. 15, 2007

(30) Foreign Application Priority Data

May 13, 2006 (GB) .................................. 0609585.5

(51) Int. Cl.
*B23K 9/16* (2006.01)
*B23K 13/06* (2006.01)
*B23K 35/38* (2006.01)
*B23K 9/00* (2006.01)

(52) U.S. Cl.
USPC .............................................. 219/72; 219/74

(58) Field of Classification Search
USPC ................... 219/72, 74, 75; 34/242; 277/412, 277/418–420, 431
See application file for complete search history.

(56) References Cited

U.S. PATENT DOCUMENTS

| | | | | |
|---|---|---|---|---|
| 2,747,066 A | * | 5/1956 | Brace | 219/615 |
| 3,219,792 A | * | 11/1965 | Pederson | 219/121.22 |
| 4,039,798 A | * | 8/1977 | Lythall et al. | 219/72 |
| 4,154,999 A | * | 5/1979 | Pinfold et al. | 219/72 |
| 4,358,300 A | * | 11/1982 | Schlapman et al. | 96/330 |
| 4,619,636 A | * | 10/1986 | Bogren | 493/109 |
| 4,654,500 A | * | 3/1987 | Stiles et al. | 219/72 |
| 5,231,258 A | | 7/1993 | Hunt | |
| 5,388,753 A | * | 2/1995 | Bjorkman, Jr. | 228/42 |
| 5,403,019 A | * | 4/1995 | Marshall | 277/413 |
| 5,483,039 A | * | 1/1996 | Gallagher | 219/125.11 |
| 5,557,920 A | * | 9/1996 | Kain | 60/39.23 |
| 5,750,954 A | * | 5/1998 | White et al. | 219/121.45 |
| 6,037,563 A | * | 3/2000 | Foster et al. | 219/121.63 |
| 7,119,301 B2 | * | 10/2006 | Langley | 219/72 |
| 7,316,252 B1 | * | 1/2008 | Heard | 152/334.1 |
| 2007/0187900 A1 | * | 8/2007 | Datta | 277/355 |

FOREIGN PATENT DOCUMENTS

| | | | |
|---|---|---|---|
| DE | 42 06 563 A1 | | 9/1992 |
| GB | 2 373 749 A | | 10/2002 |
| GB | 2 406 818 A | | 4/2005 |
| JP | 53087952 A | * | 8/1978 |
| JP | A 62-282794 | | 12/1987 |
| JP | 01133677 A | * | 5/1989 |
| JP | A 5-305596 | | 11/1993 |
| WO | WO 2004109170 A1 | * | 12/2004 |

* cited by examiner

*Primary Examiner* — Henry Yuen
*Assistant Examiner* — Hemant Mathew
(74) *Attorney, Agent, or Firm* — Oliff PLC

(57) ABSTRACT

An atmospheric shield for isolating a component from an external atmosphere is provided. The atmospheric shield includes an envelope and a base carrying a continuous channel. The base and the envelope are arranged to define an enclosure within which the component to be isolated is located, and such that a portion of the envelope extends within the continuous channel. A seal is provided within the continuous channel to seal between the envelope and the base.

20 Claims, 3 Drawing Sheets

ATMOSPHERIC SHIELD WITH A CONTINUOUS CHANNEL SEAL FOR ISOLATING WELDING COMPONENTS

The invention relates to apparatus for maintaining an inert atmosphere and more particularly atmospheric shields for use in welding processes.

The formation of components for aerospace engines can be carried out by any of several techniques of deposition of a weld material. These techniques involve the striking of an arc between two electrodes, the first electrode being held in a welding head to which is fed a supply of a weld material, the supply being in the form of a wire of the material wound on a reel. The second electrode is in the form of a substrate or foundation upon which the weld material is to be deposited to form the component. The foundation may be in the form of a metal plate. A supply of an inert gas is fed to the welding head during its operation.

When the welding head and foundation are connected to a supply of electricity, the inert gas is ionised to form a plasma and an arc is created in the plasma which melts the metal wire and the substrate. The metal is then deposited on the foundation in a controlled manner. The welding head is mounted on a robotic arm and the foundation is mounted on a moveable turntable. By controlling the movement of the arm and the turntable, the metal can be deposited on the foundation in order to form components of any design shape.

One such method of forming components is to provide the welding head with a permanent electrode and to provide a separate metal wire to the welding head. This method is generally known in the art as tungsten inert gas welding which is generally shortened to TIG welding. The use of the word tungsten is intended as a synecdoche, and it will be appreciated by those skilled in the art that other suitable materials could be used as the electrode.

Another such method involves the use of a sacrificial electrode in the welding head. With this arrangement, the metal wire which provides the weld material also constitutes the electrode and is fed through the welding head. This method is generally known in the art as metal inert gas welding, which is generally shortened to MIG welding. The presence of oxygen and nitrogen during the formation of bodies from titanium alloy using either MIG or TIG welding deposition processes causes the formation of oxides and nitrides and the body being brittle and susceptible to cracking.

In known constructions it is known to locate the welding torch, associated equipment and components in a sealed chamber, which is supplied with the inert gas, typically argon, but may be helium, neon, krypton or a gas which is inert with respect to the metal or alloy, for example nitrogen, as described in GB2373749.

However, it is expensive to provide such large chambers partially because of the volume of gas required. The chamber is relatively heavy which can apply excessive pressure to the seals which can be prone to failure especially where seals are made of rubber which has a limitation on the degree of flexing or movement, and where the seals support the envelope defining the enclosure.

If the size of the chamber is reduced below the size of the articulation and positioning arm holding the weld torch then it is necessary to provide a seal arrangements that allow for movement between the inert enclosure and the substrate, particularly where the table rotates relative to the welding arm.

It is an object of the present invention to seek to address these and other problems and to provide improved apparatus for maintaining an inert atmosphere.

According to a first aspect of the invention there is provided an atmospheric shield for isolating a component from an external atmosphere, the shield comprising an envelope, and a base carrying a continuous channel, wherein the base and the envelope are arranged to define an enclosure within which the component to be isolated in use is located and such that a portion of the envelope extends within the continuous channel, wherein a seal is provided within the channel to seal between the envelope and the base.

Preferably the continuous channel is annular. The base may be rotatable relative to the envelope.

Preferably the continuous channel has opposing sidewalls and the seal comprises a thermoplastic extrusion located on at least one of the opposing sidewalls. The thermoplastic extrusions may comprise at least one projection projecting into the channel and extending along the length of the at least one sidewall. Preferably the projection tapers towards the middle of the channel.

Preferably a plurality of projections are provided, the projections being arranged in an array extending in a direction perpendicular to the length of the projection. The seal may comprise or further comprise a thermoplastic extrusion located on the portion of the envelope that extends within the channel. Preferably the thermoplastic extrusion on the envelope comprises at least one projection projecting into the channel and extending along the length of the portion of the envelope that extends within the channel. These projections may taper towards the side of the channel and may be arranged in an array extending in a direction perpendicular to the length of the projection.

Preferably the array of projections on the or each sidewall interleaves with the array of projections on the portion of the envelope that extends within the channel.

According to a second aspect of the invention there is provided an atmospheric shield for isolating a component from an external atmosphere the shield comprising an envelope and a base arranged to define a primary enclosure within which the component to be isolated in use is located, wherein the base carries housing means within the primary enclosure that isolates a sub-enclosure having a first gas pathway between the sub-enclosure and the atmosphere external of the envelope and a second gas pathway between the sub-enclosure and the primary enclosure, wherein means are provided to supply a gas to the sub-enclosure.

Preferably the resistance to gas flow is greater in the first gas pathway than the second gas pathway. The gas supplied to the sub-enclosure may be directed towards the first gas pathway.

Preferably the gas in the sub-enclosure has a pressure $P_1$, wherein $P_1$ is greater than the pressure of the atmosphere outside the shield. Preferably the pressure in the sub-enclosure is higher than the pressure in the enclosure.

The housing may provide support to the envelope, preferably the support is provided by alignment means, which may facilitate relative movement between the envelope and the base. Preferably the relative movement is rotation.

Preferably the second gas pathway is provided with a brush seal at the end adjacent the primary enclosure for reducing turbulence of gas entering the primary enclosure.

Preferably in the atmospheric shield according the invention the envelope further comprises a welding arm extending therethrough.

According to a third aspect of the invention there is provided a seal for a gas pathway comprising a first wall carrying a thermoplastic extrusion extending along the length of the wall and a second wall spaced apart from and opposing the first wall, the second wall carrying a thermoplastic extrusion extending along the length of the wall, wherein each thermoplastic extrusion has a plurality of projections arranged in an array that extends in a direction perpendicular to the length of each wall and wherein the projections of the wall and the opposing walls interleave to define a tortuous pathway.

Preferably the first wall forms part of a channel and the second opposing wall forms part of a member extending within the channel. The seal may have a third wall on the reverse side of the member and a fourth wall as part of the channel spaced apart from and opposing the third wall.

The channel may have a base connecting the first wall and the fourth wall and with the base is spaced from the member.

The third wall and the fourth wall may each carry a thermoplastic extrusion extending along the length of the wall, wherein each thermoplastic extrusion has a plurality of projections arranged in an array that extends in a direction perpendicular to the length of each wall and wherein the projections of the third wall and the fourth wall interleave to define a tortuous pathway.

Embodiments of the present invention will now be described by way of example only and with reference to the accompanying drawings, in which.

Figure 1:
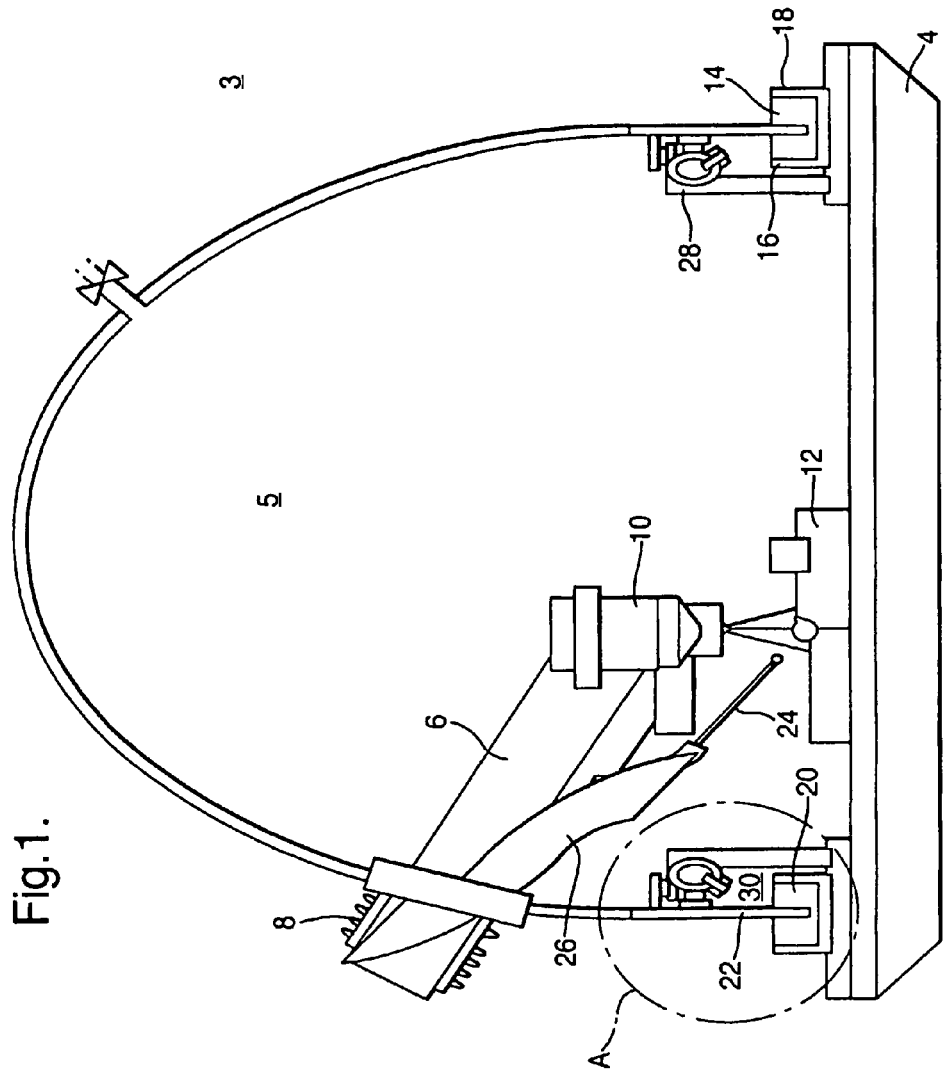
FIG. 1 depicts an atmospheric shield in accordance with the invention

FIG. 1 shows an atmospheric shield in accordance with the present invention. The shield comprises an envelope 2 mounted on a base 4 which together define an enclosure 5. An arm 6 extends through an aperture in the envelope and has a bellow or concertina type seal 8 preventing leakage of gas from or into the enclosure 5 whilst still allowing movement of the arm 6, and in particular of a welding head 10 mounted to the arm 6, relative to the envelope.

A supply of metal wire 24 is provided, in the form of a reel around which the wire is wound. The metal is in the form of a titanium alloy, for example titanium 6/4 which includes 6% aluminium and 4% vanadium. The wire is fed from the reel to the welding head 10 such that the end of the wire 24 is arranged just below the tip of the welding head 10. The wire 24 is held in place by suitable holding means 26.

The base 4 supports a component 12 formed from the deposition of the material of the wire 24, or to which the material of the wire 24 is added to build on the component 12.

In the preferred embodiment the base 4 can be rotated relative to the envelope. Once the table has been located in the correct position relative rotation is then preferably inhibited by an anti-rotation device (not shown), which may be as simple as a peg engaging with an aperture. From this point, until the anti-rotation device is disengaged, the bellows seal 8 permits sufficient relative movement between the welding arm and the component. Control means in the form of a computer can control the position of the component relative to the welding arm, and can also control both the movement of the welding arm and the feed of the metal wire 24.

The envelope 2 is formed by a suitable rigid material, for example aluminium or a plastic material. The envelope may also comprise windows to view the body being formed therein and a door to allow access inside the enclosure. The envelope is also provided with a valve 7 which allows the pressure inside the enclosure to be controlled and enables a through-flow of gas within the enclosure.

The enclosure 5 contains an atmosphere isolated from the atmosphere 3 outside the envelope and at a slightly higher pressure. The atmosphere inside the enclosure is supplied with an inert gas, for example argon, such that it is substantially devoid of oxygen, or at least having less that 40 ppm oxygen therein, and is substantially devoid of nitrogen, or at least having less than 140 ppm nitrogen therein.

Figure 2:
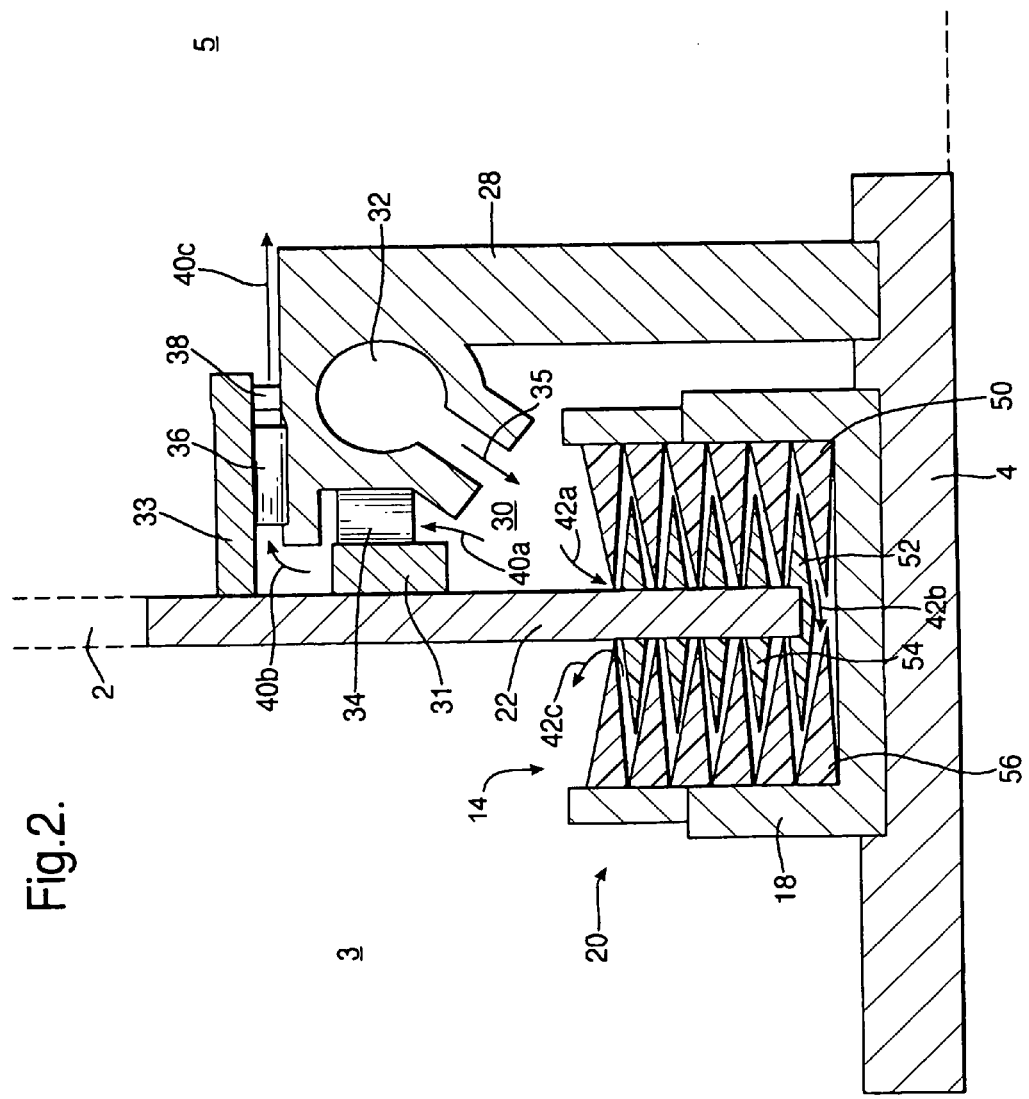
FIG. 2 depicts an expanded view of portion A of FIG. 1.
Figure 3:
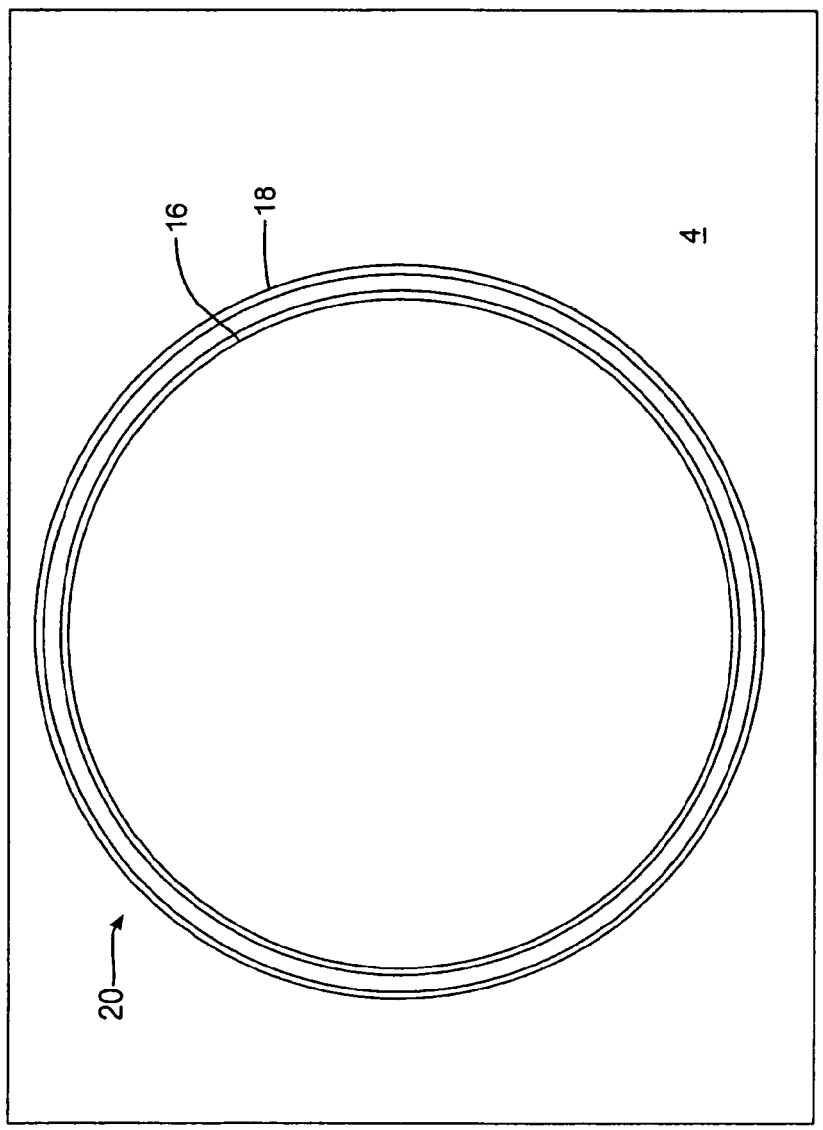
FIG. 3 depicts a plan view of the continuous channel 20.

To maintain the atmosphere a seal is provided between the base and the envelope. The seal comprises a channel 20 defined by two opposing walls 16, 18. In the embodiment the channel is a separate component mounted to the base but it could, of course be a depression moulded or machined into the base. Referring to FIG. 3, the channel 20 is continuous in that it extends around the base 4 preferably in an annular manner. For clarity, other features of FIGS. 1 and 2 are not shown in FIG. 3.

Referring back to FIG. 1, a portion of the envelope 22 extends within the channel and a seal 14 is provided in the channel between the walls 16, 18 and the envelope portion 22.

The seal may be any appropriate seal including but not exclusively, liquid seals, brush seals and leaf seals. A preferred seal will be described in detail later in this specification. Preferably the envelope does not extend to the bottom of the channel to reduce friction and the possibility of damage to the envelope or base when they rotate relative to each other. The spacing between the envelope and the base of the channel allows for a controlled volume of gas to leak from the enclosure 5 to the external atmosphere 3.

Within the enclosure a housing 28 is provided both to support, or help support the envelope and to define a sub-enclosure 30, which further isolates the enclosure 5 from the external atmosphere 3.

FIG. 2 depicts the section A of FIG. 1 in greater detail. The housing 28 is mounted to the base 4 in a fixed arrangement. A conduit 32 within the housing directs a flow of argon 35 into the sub-enclosure 30.

The portion of the envelope 22 that extends within the channel 20 carries a first 31 and second flange 33 that extend from the envelope into the enclosure 5 and provide faces against which roller bearings 34 and 36 respectively act. The rollers enable easy rotation of the envelope 2 relative to the base 4 and serve to aid alignment of the two components.

The inert gas supplied from the conduit 32 pressurises the sub-enclosure 30 to a pressure that is greater than the external atmosphere 3 and preferably greater than the pressure in the enclosure 5. Gas may be removed from the enclosure by opening valve 7.

The enclosure is supplied with gas from conduit 32 through the sub-enclosure 30 by a gas path 40a, 40b and 40c that flows past the rollers providing alignment and into the enclosure 5. A brush seal 38 mounted to either the second flange 33, or the housing 28 and positioned at the exit of the gas path serves to reduce turbulence in the gas flow which may be induced when the envelope and the base rotate relative to each other.

The seal 14 within the channel is beneficially shielded from thermal or electromagnetic radiation by the housing 28. The argon supplied by the conduit 32 is directed onto the seal to maintain a continuous flow of cooling gas that serves to further protect the seal from damage by the hot welding products.

The seal gives a gas path 42a, 42b, 42c that provides a controlled leakage pathway between the sub-enclosure 30 and the external atmosphere 3. The seal is formed of a number of extrusions of a plastic, preferably high density polyethylene. Such extrusions are cheap and easily manufactured, it will be appreciated that other materials may be appropriate, but may add to the cost of the seal.

A first extrusion 50 is located on the radially inner wall of the channel 18 and extends around the entire length of the channel. A second extrusion 52 is located on the inwardly facing wall 22 of the portion of the envelope within the channel. Each of the extrusions have projections and the projections, which preferably taper, on each extrusion, interleave with the projections on the opposing extrusion. The protrusions, between them, define an elongate serpentine type flow path that allows a controlled leakage of gas to pass therethrough.

In the preferred embodiment a third extrusion 54 with similar projections is mounted, or integrally formed with the outwardly facing wall of the envelope 22 and a fourth extrusion 56 with similar projections and interleaved with the projections of the third extrusion is mounted to the radially outer wall of the channel.

The gas path 42*a*, 42*b*, 42*c* has a greater resistance to the flow of gas than the gas path 40*a*, 40*b*, 40*c*.

Various modifications may be made without departing from the scope of the invention. For example, the base may be fixed relative to the envelope, the component to be modified may be mounted to a rotatable support located wholly within the enclosure. The welding apparatus may be located wholly within the enclosure.

For example, the envelope may be supported at other points rather than just against the surfaces of the housing, which will reduce the strength that is required to be provided by the housing. The supports may be external of the envelope.

The envelope may also be a different shape to hemispherical. For example, it may be columnar, or cuboid in structure. It will be appreciated that cuboid structures are unlikely to be rotatable relative to the base on which they are mounted.

It will be appreciated that the described invention allows lower cost adoption of additive manufacturing techniques. In particular, by allowing reduced chamber sizes, capital costs can be reduced and the volume of argon which must be maintained at high purity in the system is also reduced.

We claim:

1. An atmospheric shield for isolating a component from an external atmosphere, the atmospheric shield comprising:
    an envelope; and
    a continuous channel fixed to a base,
    the base and the envelope being arranged to define an enclosure, the enclosure including a primary enclosure and a sub-enclosure, within which the component to be isolated in use is located and such that a portion of the envelope extends within the continuous channel,
    a controlled leakage seal being provided within the continuous channel to seal between the portion of the envelope extending within the continuous channel and the base, such that the controlled leakage seal surrounds a portion of the envelope located nearest to the base,
    the envelope containing an integral housing within the envelope which defines the sub-enclosure and isolates the sub-enclosure from the primary enclosure within the envelope,
    the integral housing is fixed to a portion of the base located within the primary enclosure, and surrounds a portion of the controlled leakage seal provided between the envelope and a portion of the continuous channel located within the enclosure, wherein
    the integral housing provides support to the envelope and further isolates the primary enclosure from the atmosphere external of the envelope;
    a first gas pathway being provided in the controlled leakage seal to communicate the sub-enclosure with the atmosphere external of the envelope and a second gas pathway being provided to communicate the sub-enclosure with the primary enclosure, and
    a further conduit being provided to supply a gas to the sub-enclosure.

2. The atmospheric shield according to claim 1, wherein the continuous channel is annular.

3. The atmospheric shield according to claim 2, wherein the base is rotatable relative to the envelope.

4. The atmospheric shield according to claim 1, wherein the continuous channel has opposing sidewalls having a length that extends around the periphery of the continuous channel and a middle equispaced from the opposing sidewalls and the seal has a thermoplastic extrusion located on at least one of the opposing sidewalls and having a length along the at least one of the opposing sidewalls.

5. The atmospheric shield according to claim 4, wherein the thermoplastic extrusion has at least one projection projecting into the continuous channel and extending along the length of the at least one of the opposing sidewalls.

6. The atmospheric shield according to claim 5, wherein the at least one projection tapers towards the middle of the continuous channel.

7. The atmospheric shield according to claim 5, wherein a plurality of projections are provided, the projections being arranged in an array extending in a direction perpendicular to the length of the thermoplastic extrusion.

8. The atmospheric shield according to claim 1, wherein the seal has a thermoplastic extrusion located on the portion of the envelope that extends within the continuous channel.

9. The atmospheric shield according to claim 8, wherein the thermoplastic extrusion has at least one projection projecting into the continuous channel and extending along a length of the portion of the envelope that extends within the continuous channel.

10. The atmospheric shield according to claim 9, wherein at least one projection tapers towards a side of the continuous channel.

11. The atmospheric shield according to claim 9, wherein a plurality of projections are provided, the projections being arranged in an array extending in a direction perpendicular to the length of the thermoplastic extrusion.

12. The atmospheric shield according to claim 11, wherein an array of projections on a sidewall of the continuous channel interleaves with the array of projections extending in the direction perpendicular to the length of the thermoplastic extrusion.

13. The atmospheric shield according to claim 1, wherein the envelope further includes a welding arm extending therethrough so that a portion of the welding arm is in the external atmosphere and a further portion of the welding arm is within the envelope.

14. A seal for a gas pathway in an atmospheric shield, the seal comprising:
    a portion of an envelope of the atmospheric shield;
    a base of the atmospheric shield;
    a continuous channel fixed to a portion of the base of the atmospheric shield, the base and the envelope being arranged to define an enclosure within which a component to be welded is located;
    a thermoplastic extrusion extending along a length of a first wall, the first wall being formed by the continuous channel fixed to the portion of the base; and
    a thermoplastic extrusion extending along a length of a second wall, the second wall being formed by the portion of the envelope, wherein
        the second wall is spaced apart from and opposing the first wall,
        the envelope further includes a welding arm extending therethrough, such that a portion of the welding arm is in the atmosphere and a further portion of the welding arm is within the enclosure;

each thermoplastic extrusion has a plurality of projections arranged in an array that extends in a direction perpendicular to the length of the first wall and the length of the second wall; and the projections of the thermoplastic extrusion carried on the first wall interleave with the projections of the thermoplastic extrusion carried on the second wall to define a tortuous pathway permitting a controlled leakage of a gas to pass through.

15. The seal according to claim 14, wherein the seal has a third wall on the reverse side of the envelope and a fourth wall as part of the continuous channel spaced apart from and opposing the third wall.

16. The seal according to claim 15, wherein the continuous channel has a base connecting the first wall and the fourth wall and wherein the base of the channel is spaced from the envelope.

17. The seal according to claim 16, wherein the third wall carries a thermoplastic extrusion extending along a length of the third wall and the fourth wall carries a thermoplastic extrusion extending along a length of the fourth wall, wherein each thermoplastic extrusion has a plurality of projections arranged in an array that extends in a direction perpendicular to the length of each wall and wherein the projections of the thermoplastic extrusion carried on the third wall and the projections of the thermoplastic extrusion carried on the fourth wall interleave to define a tortuous pathway.

18. The atmospheric shield according to claim 13, wherein the welding arm is connected to the envelope.

19. The atmospheric shield according to claim 18, wherein the welding arm is connected to the envelope by a bellows seal.

20. The atmospheric shield according to claim 1, wherein the continuous channel has opposing sidewalls having a length that extends around the periphery of the continuous channel and a middle equispaced from the opposing sidewalls and the seal has a thermoplastic extrusion extending from at least one of the opposing sidewalls and having a length along the at least one of the opposing sidewalls.

* * * * *